(12) United States Patent
Atallah et al.

(10) Patent No.: US 9,103,490 B2
(45) Date of Patent: Aug. 11, 2015

(54) CHASSIS, BASE, AND NEGATOR SPRING

(75) Inventors: Jean G. Atallah, Fremont, CA (US);
John J. Briden, San Francisco, CA (US); John William Pennington, Jr., Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 660 days.

(21) Appl. No.: 12/764,876

(22) Filed: Apr. 21, 2010

(65) Prior Publication Data

US 2011/0260028 A1    Oct. 27, 2011

(51) Int. Cl.
*F16M 11/04* (2006.01)
*F16M 11/10* (2006.01)
*F16M 11/24* (2006.01)

(52) U.S. Cl.
CPC ............... *F16M 11/04* (2013.01); *F16M 11/10* (2013.01); *F16M 11/24* (2013.01); *F16M 11/046* (2013.01); *F16M 2200/024* (2013.01); *F16M 2200/08* (2013.01); *Y10S 248/923* (2013.01)

(58) Field of Classification Search
USPC ......... 248/132, 149, 155.2, 157, 295.11, 919, 248/920; 267/229, 36.1, 40, 47, 158, 160
See application file for complete search history.

(56) References Cited

U.S. PATENT DOCUMENTS

| | | | |
|---|---|---|---|
| 3,794,068 A | 2/1974 | Milroy | |
| 4,625,731 A | 12/1986 | Quedens | |
| 5,520,361 A * | 5/1996 | Lee | 248/398 |
| 6,227,508 B1 | 5/2001 | Panzarella | |
| 6,783,105 B2 | 8/2004 | Oddsen | |
| 7,222,831 B2 | 5/2007 | Oddsen | |
| 7,621,489 B2 | 11/2009 | Cvek | |
| 7,644,897 B2 * | 1/2010 | Shin | 248/176.1 |
| 7,690,620 B2 * | 4/2010 | Lee | 248/676 |
| 2004/0011932 A1 * | 1/2004 | Duff | 248/157 |
| 2005/0258334 A1 * | 11/2005 | Hwang et al. | 248/920 |
| 2005/0270732 A1 * | 12/2005 | Titzler et al. | 361/681 |
| 2009/0108511 A1 | 4/2009 | Bivin et al. | |
| 2009/0112163 A1 | 4/2009 | Bivin et al. | |
| 2011/0155869 A1 * | 6/2011 | Chen | 248/125.8 |

FOREIGN PATENT DOCUMENTS

| | | | | |
|---|---|---|---|---|
| JP | 11044140 A | * | 2/1999 | E05C 19/06 |
| JP | 2007278992 A | * | 10/2007 | G01B 3/10 |

* cited by examiner

*Primary Examiner* — Alfred J Wujciak
(74) *Attorney, Agent, or Firm* — Hewlett-Packard Patent Department

(57) ABSTRACT

A base, a chassis and a negator spring. The negator spring has a first cross sectional area and a second cross sectional area. The negator spring can oppose a force on the chassis.

23 Claims, 6 Drawing Sheets

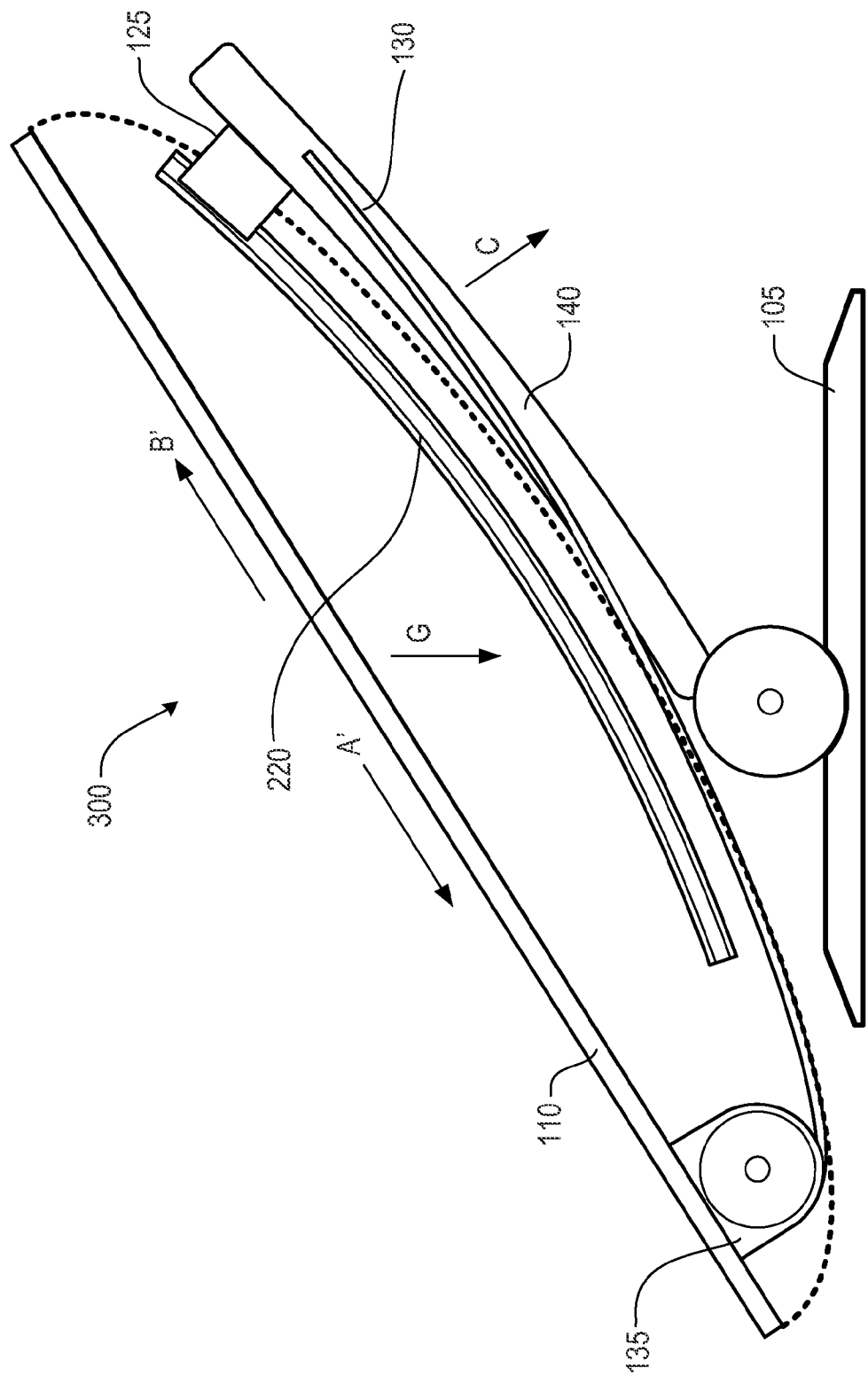

CHASSIS, BASE, AND NEGATOR SPRING

BACKGROUND

A display can be supported by a base attached to the display. The base may be a fixed base wherein the display is a predetermined height and tilt relative to the base. The base may also be an adjustable base wherein the height of the display can be changed relative to the base. A base may also allow the display to be tilted so that the top of the display is closer or further from the user than the bottom of a display. The mounting point of the base to the display can be fixed so that the weight distribution of the display does not change.

BRIEF DESCRIPTION OF THE DRAWINGS

Some embodiments of the invention are described with respect to the following figures:

FIG. 3 is a system according to an example embodiment of the invention;

DETAILED DESCRIPTION

Figure 1:
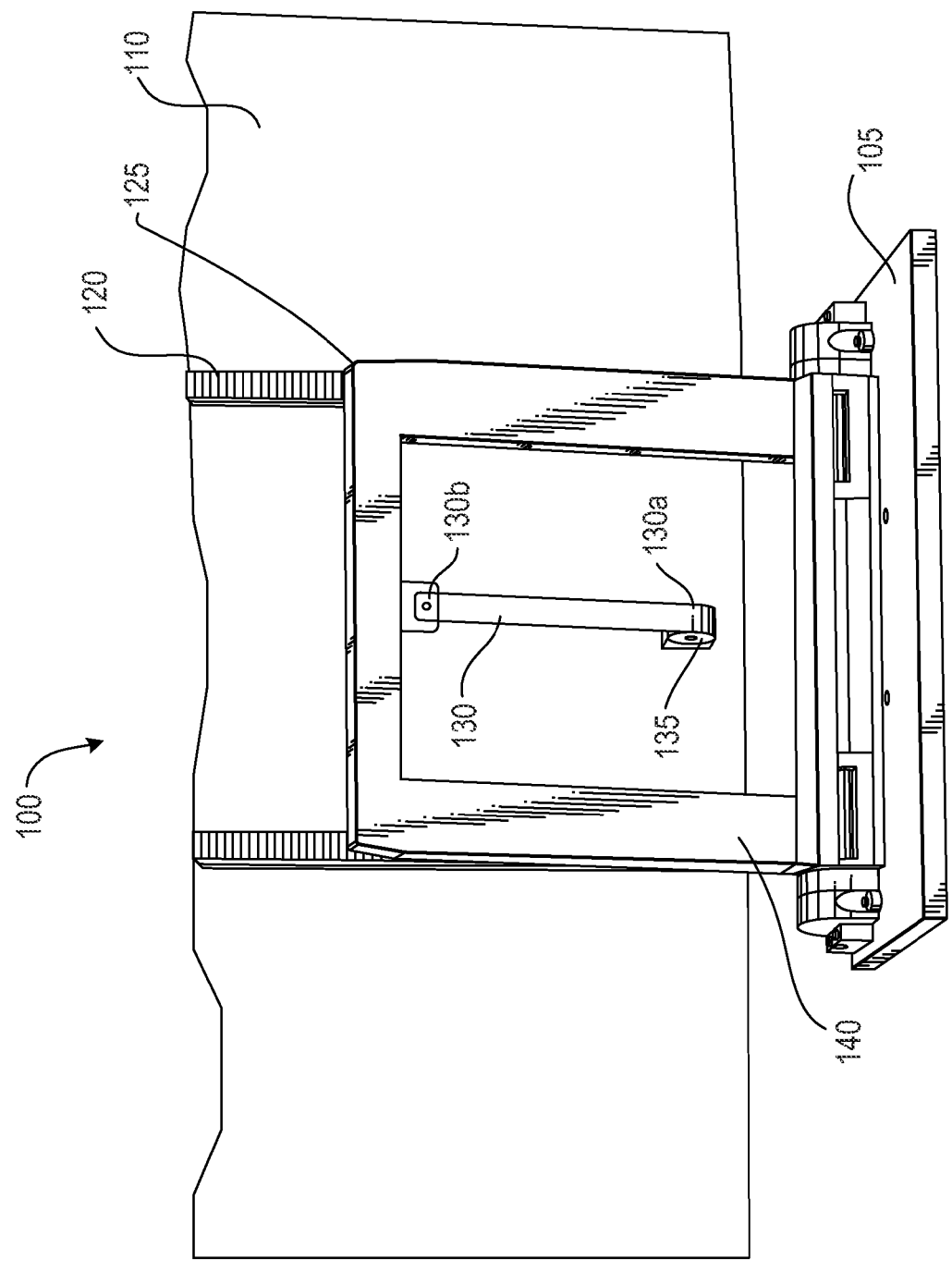
FIG. 1 is a system according to an example embodiment of the invention.

A device such as a display can be attached to a base. A base may include a foot and an extension from the foot. The extension can support the chassis. The chassis may be a display or may be a mounting point for a display. A base may include allow the orientation of the chassis to be adjusted for the user's application. The adjustments can allow the chassis attached to the base to be tilted, raised, lowered, or rotated for example.

Different software applications may be more efficiently used if the display could be in a vertical, a horizontal, or an orientation between vertical and horizontal. The vertical orientation is where the surface of the display is parallel to the force of gravity and the horizontal orientation is where the surface of the display is perpendicular to the force of gravity. To keep the chassis from causing the system from becoming unstable and fall when the chassis is tilted the base is mounted as close to the center of gravity as possible or chassis range of tilt is limited to a position that the chassis is still stable. If a base is connected to the center of gravity of the chassis and the chassis is tilted from a vertical position to a horizontal position then the display may be too high to be useable. For example if the base was attached to a chassis at a point 25 centimeters from a work surface and the chassis was tilted until it reached a horizontal position the surface of the chassis would be 25 centimeters from the work surface. To make the device usable in a horizontal orientation the distance from the work surface the base is on to the chassis can be reduced. In one embodiment the base includes a foot and an extension. The extension includes a fastener to connect the base to the chassis. The height of the fastener can be changed tilting the extension so that the top end of the extension becomes closer of the foot of the base. If the chassis includes a display the top of the display may be moved away from the user. The variable mounting point on the chassis can allow the chassis to move toward the user without moving the base toward the user. If the extension is tilted and the variable mounting point is adjusted the bottom of the chassis may be closer to the use than if the chassis was in a vertical orientation.

Using a variable mounting point on the chassis supporting the device causes the center of gravity of the chassis to move relative to the base causing a change in the weight distribution of the chassis. If the weight distribution of the chassis is variable and a constant counter force to gravity is applied between the chassis and the base the chassis may appear to become heavier or lighter because the base may be supporting more or less of the weight of the chassis. For example the counter force on the chassis in a vertical orientation may have to counter 100% of the force of gravity on the chassis but in a horizontal orientation the counter force on the chassis may have to counter 60% of the force of gravity on the chassis because the change in weight distribution of the chassis caused some of the weight, for example 40%, to be countered by the base. A force applied by a spring that is appropriate if the spring is counting 100% of the weight of the chassis may not be appropriate if the base is supporting less than 100% of the weight of the chassis.

In one embodiment a spring that can supply a varied amount of force to the chassis to counter the force of gravity on the display can be used if the weight distribution of the chassis is changing when the center of gravity is changed relative to the base. The spring may be for example a negator spring. A negator spring can be a flat material that is coiled up.

In one embodiment a system can include a base, a chassis and a negator spring. The chassis can be connected to a base by a variable mounting point. The negator spring can include at least a first and a second cross sectional area to oppose a force as the display is moved along the variable mounting point.

With reference to the figures, FIG. 1 is a system according to an example embodiment of the invention. The system includes a base 100 with a foot 105. The base 105 includes an extension 140. The extension 140 extends from the foot 105 and connects to a chassis 110. The chassis can be the mounting point for a device such as a display. The extension 140 may be at a fixed angle to the base or maybe movable such that the angle between the extension 140 and the base 105 can be changed.

The chassis 110 can include a track 120. The extension 140 may be attached to the track 120. The extension can be attached to the chassis at multiple mounting points, for example a first mounting point where the extension 140 is attached to a first point along the track 120 and a second mounting point where the extension 140 is attached to a second point along the track 120. In one embodiment, the track can reduce the chance of causing one side the chassis 110 to move up or down faster than the other size causing the chassis 110 to bind against the extension 140. The extension 140 can include a fastener 125 to connect to the track 120. In one embodiment the track 120 includes teeth that align with teeth from a fastener 125 such as a gear. In one embodiment two gears may be synchronized so that the left and right sides of the chassis move at the same rate relative to the base.

A negator spring 130 can be attached to the chassis 110. The negator spring can be attached using mount 135 to the chassis 110. The negator spring 130 can also be attached to the extension 140. The negator spring 130 includes a coiled end 130a and a free end 130b. It does not matter whether the coiled end 130a is attached to the chassis 110 or the extension 140 as long as the free end 130b is attached to either the chassis 110 or the extension 140 that the coiled end 130a is not attached to. In one embodiment multiple negator springs may be connected between the extension 140 and the chassis 110.

If the fastener 125 moves along the track 120 and the extension is not vertical then the center of gravity of the chassis changes relative to the base causing the weight distribution of the chassis to change. As the weight distribution of the chassis changes the negator spring 130 may be applying to much or too little force to counter the force of gravity. To vary the force that is applied by the negator spring 130 the cross sectional area of the negator spring may change along the negator spring between the coiled end 103a and the free end 103b.

Figure 2:
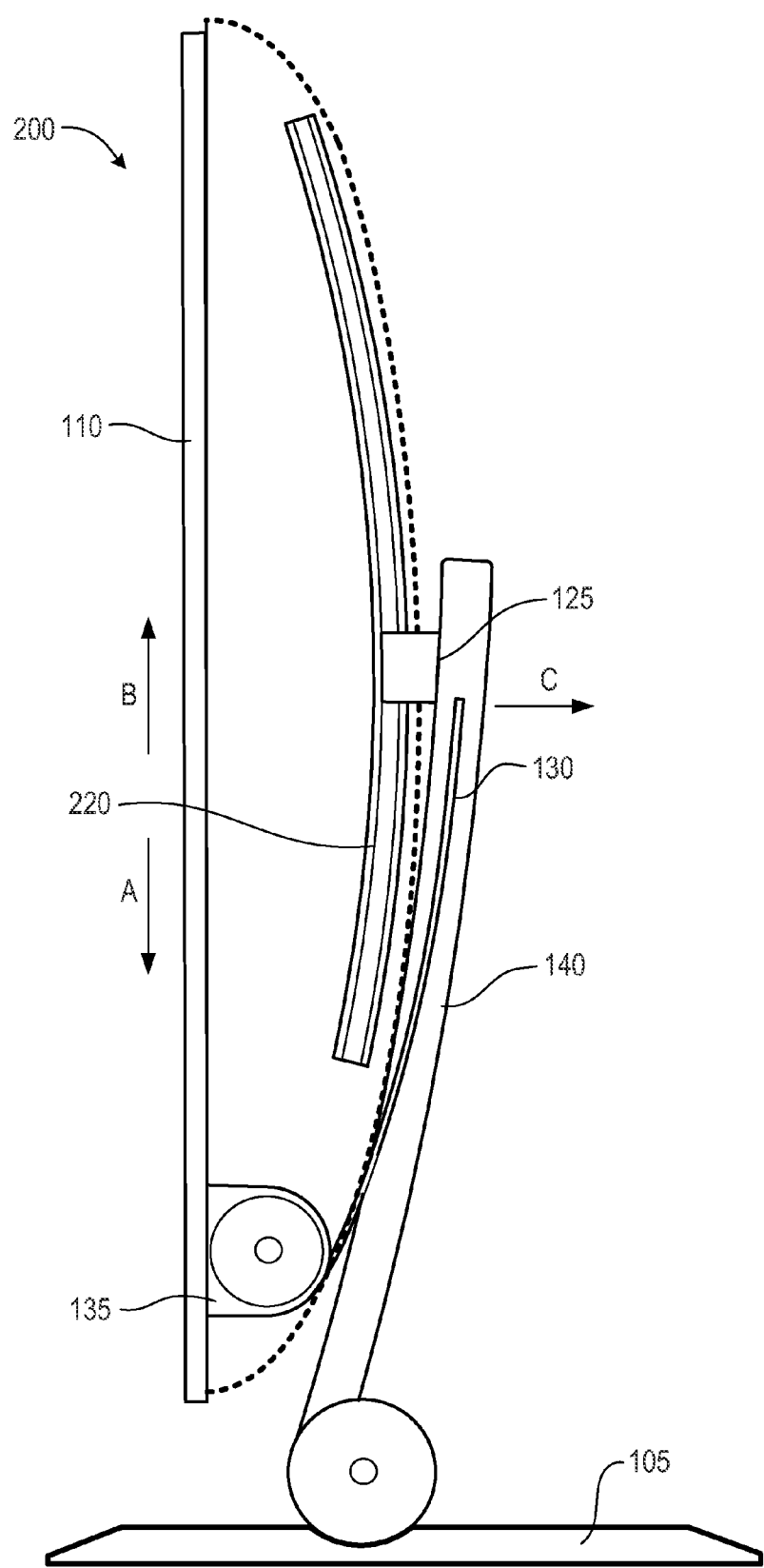
FIG. 2 is a system according to an example embodiment of the invention.

FIG. 2 is a system according to an example embodiment of the invention. The system 200 includes a foot 105 connected to an extension 140. The extension 140 is connected to a track 220 attached to the chassis 110. The track 220 may be straight or curved. A fastener 125 may connect the extension 140 to the track 220.

If the chassis moves in the direction A, the chassis will move down toward the foot 105 and the negator spring 130 can be extended further from the mount 135. The chassis can move in the direction B and the negator spring 130 can coil up at mount 135. In the orientation of the chassis 110 of system 200 the negator spring counters 100% of the force of gravity applied to the chassis 110. In the orientation of the chassis 110 of system 200 the force of gravity is acting in direction G on the chassis and the negator spring 130 is acting on the chassis in the B direction parallel and in a direction 180 degrees from the force of gravity on the chassis 110.

FIG. 3 is a system according to an example embodiment of the invention. The system 300 includes a foot 105 connected to an extension 140. The extension 140 can be tilted in the direction C so that the extension is not vertical. A track 220 can be attached to the chassis 110. A fastener 125 can be connected between the extension 140 and the track 220.

As the extension tilts in the direction C, the chassis 110 can move further in the direction A'. If for example the extension was perpendicular to the foot 105 then the chassis could move as far as the foot 105 before the foot would prevent further movement in the direction A'.

Moving the extension 140 in the direction C and moving the chassis 110 in the direction A' can move the base away from the center of gravity of the chassis 110. The force of gravity on the chassis 110 is in the direction G however the force being applied by the negator spring 130 to the chassis is in the direction B' which is not 180 degrees from the force of gravity G on the chassis 110 if the extension has been tilted in the direction C. Since the direction and the amount of force applied by gravity in the direction G to the chassis does not change the amount of counter force does not change, however if the direction of the counter force to gravity changes is changed from being parallel to the force of gravity then the counter force may have to be adjusted.

Changing the weight distribution of the chassis 110 by moving the center of gravity of the chassis 110 relative to the base of the computer can cause the negator spring to apply a force between the extension 140 and the chassis 110 that is not the right counter force for the position of the chassis 110. For example the negator spring should have a force at least equal to or greater than the force applied by gravity on the chassis 110. If the movement of the chassis 110 in the A direction relative to the extension 140 is parallel to the direction of the force of gravity G then the negator spring may have a force at least equal to the weight of the chassis 110. For example if the chassis has a weight of 3 kilograms the negator spring may have a force of 3 kilograms applied in the 180 degree direction of gravity G. If the direction A' of movement of the chassis 110 relative to the extension 140 is not parallel to the direction of gravity G then the force applied by the negator spring 130 between the extension 140 and the chassis 110 can be less than the force applied by the negator spring 130 if the direction of movement of the chassis in the direction A is in the direction G of the force of gravity on the chassis 110. If the extension 140 is tilted the base may counter the force of gravity in the D direction and reduce the amount of force provided by the negator spring 130 to counter the force of gravity. For example the base may be supporting 1 kilogram of weight and reducing the force that the negator spring counters by 1 kilogram, however because the force vector of the negator spring in the orientation of system 300 is not 180 degrees from the force vector of gravity G the reduction of force from the negator spring in the direction B' may not be 1 kilogram of force in the direction B'. For example if the direction B' of the force of the negator spring 130 is 45 degrees from the direction G of gravity then the negator spring may be applying more than 1 kilogram of force in the direction B' to generate 1 kilogram of force in the D direction. As the direction B' of the force of the negator spring 130 is changed relative to the direction G of the force of gravity, the force applied by the negator spring in the direction D on the chassis 130 change.

Figure 4A:
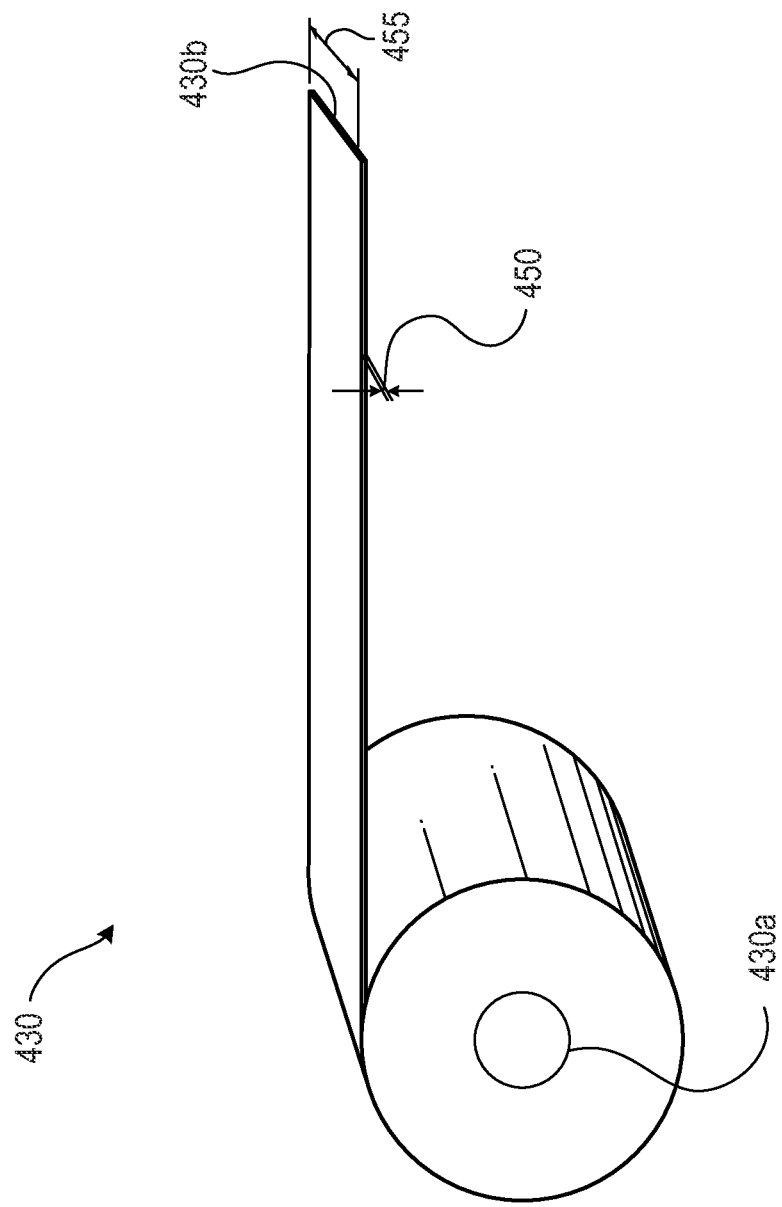
FIG. 4A is a negator spring according to an example embodiment of the invention.

FIG. 4A is a negator spring according to an example embodiment of the invention. A negator spring 430 includes a coiled end 430a and a free end 430b. The negator spring 430 is made of a material that has a thickness 450 and a width 455. The thickness 450 and the width 455 determines the cross sectional area of the negator spring. The cross sectional area can determine the amount of force that is applied by the negator spring. As the free end 430b is extended in a direction away from the coiled end 430a the coiled end applies an force in the opposite direction to the force exerted on the free end 430b as it is being pulled away from the coiled end 430a. The cross sectional area can determine the amount of force that is applied by the negator spring. As the free end 430b of the negator spring is extended away from the coiled end 430a different sections of the negator spring are applying force in the direction opposite the direction the free end 430b is being pulled. Because the cross sectional area determines the amount of force and the force is being applied by different sections of the negator spring as the free end 430b is extended away from the coiled end 430a varying the cross sectional area of the negator spring can result in at least a first amount of force when the first cross sectional area is applying the force and a second amount of force when the second cross sectional area is applying the force.

Figure 4B:
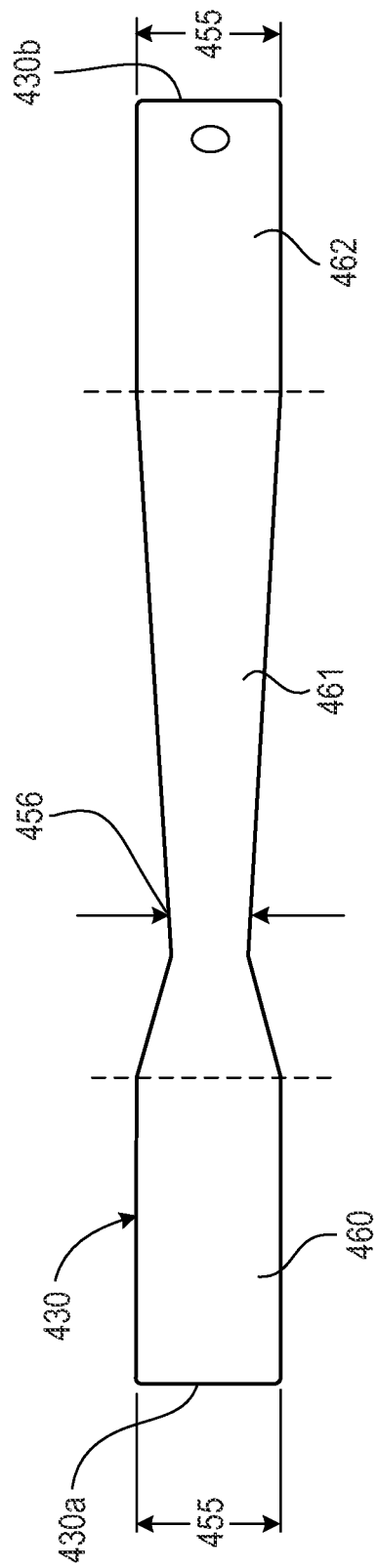
FIG. 4B is a negator spring according to an example embodiment of the invention.

FIG. 4B is a negator spring according to an example embodiment of the invention. The negator spring 430 includes a first end 430a and a second end 430b. The negator spring 430 is stretched out into a flat material such that the first end 430a is the coiled end and the second end 430b is the free end.

A negator spring 430 can have sections with different cross sectional areas. For example a first section 460, a second section 461 and a third section 462 with different cross sectional area. The first section 460 can have a first width, the second section can have a second width and the third section can have a third width. In another embodiment the thickness of the negator spring 430 may be varied instead of the width or in addition to the width of the negator spring 430. In one embodiment a section of the negator spring may have a force that gradually changes as the free end 430b is extended away from the coiled end 430a. For example the width of the second section 461 of the negator spring 430 is tapered from the same width of as the width of section 462 to a narrower width 456. The variable negator spring may have two cross sectional areas between the free end 430b and the coiled end 430a or may have more than two cross sectional area between the free end 430b and the coiled end 430a.

The cross sectional area of the variable negator spring can be changed by a number of different ways. For example the negator spring may have a constant width 455 includes openings through the negator spring or indentions in the surface of the negator spring 430. The negator spring may have different layers of material that can be changed to vary the force applied by the negator spring.

Figure 5:
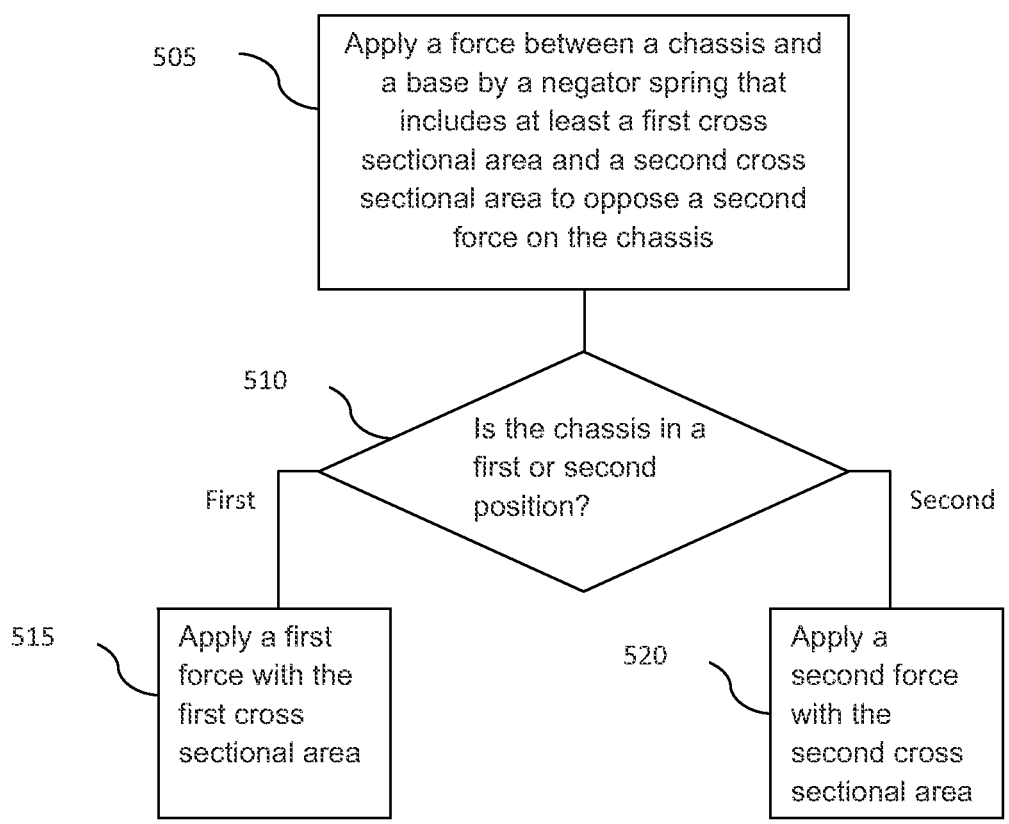
FIG. 5 is a flowchart of an example embodiment of a method of the invention.

FIG. 5 is a flowchart of an example embodiment of a method of the invention. The method 500 of supporting a chassis system begins by applying a force between a chassis and a base by a negator spring that includes at least a first cross sectional area and a second cross sectional area to oppose a second force on the chassis at 505. The chassis can be moved along a variable mounting point to change the position of the chassis relative to the base.

If the chassis is in a first position at 510 then the negator spring can apply a first force to the chassis with the first cross sectional area at 515. If the chassis is in a second position at 510 then the negator spring can apply a second force to the chassis with the second cross sectional are at 520.

As the chassis is transitions from a first position to a second position the base can apply a third force to the chassis to oppose the second force. if the base is applying a third force to the chassis the negator spring may not oppose as much of the second force as the negator spring opposed if the chassis was in another position. For example if the second force is gravity and the base is applying a force to the chassis that is in the opposite the direction of gravity then the force from the negator spring applied to the chassis can be reduced as the percentage of the force of gravity on the chassis opposed by the base is increased.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system to adjust a chassis of an electronic display monitor relative to a base comprising:
   the base;
   the chassis connected to the base by a variable mounting point; and
   a negator spring to oppose a force as the chassis is moved along the variable mounting point, wherein the variable mounting point is curved from the top of the chassis to the bottom of the chassis, the negator spring comprising a band having an overall length extending between a first end attached to the base and a second end attached to the chassis, the band comprising:
   a first section along the overall length, which when uncoiled, has a first length, a first constant width along the first length and a first cross-sectional area;
   a second section along the overall length, which when uncoiled, has a second length, a second constant width along the second length and a second cross-sectional area; and
   a third section along the overall length between the first section and the second section, which when uncoiled, has a third length greater than the first length and the second length, the third section having a third cross-sectional area different than the first cross-sectional area and the second cross-sectional area.

2. The system of claim 1, wherein the chassis includes a back and a front and the variable mounting point is attached to the back.

3. The system of claim 1, wherein the variable mounting point is a track.

4. The system of claim 1, wherein the variable mounting point creates a change in the angle of the chassis relative to the base.

5. The system of claim 1, wherein the base further comprises a first and a second connection to the variable mounting point.

6. The system of claim 1, wherein the first end is coiled.

7. The system of claim 1, wherein the second end is coiled.

8. The system of claim 1, wherein the first section of the band has a first width and a first thickness, wherein the second section of the band has a second width and a second thickness and wherein at least one of the first width and the first thickness is different than the second width and the second thickness, respectively.

9. The system of claim 1, wherein the band has a width that tapers in a direction along the length.

10. The system of claim 1, wherein the first section has the first cross-sectional area when flat and linear and wherein the second section has the second cross-sectional area when flat and linear.

11. The system of claim 1, wherein portions of the band are coiled about an axis and wherein the first cross-sectional area and the second cross-sectional area extend in planes that are parallel to the axis.

12. The system of claim 1, wherein band has a free end and a coiled end, wherein the band has a width that narrows towards the coiled end.

13. The system of claim 1, wherein the first section and the second section are windable about an axis.

14. The system of claim 1, wherein portions of the band are wound into a coil, wherein the first section applies a first force opposing unwinding of the coil and wherein the second section applies a second force, different than the first force, opposing unwinding of the coil.

15. The system of claim 1, wherein the band comprises a third section having a third cross-sectional area the same as the first cross-sectional area of the first section, wherein the second section extends between the first section and the third section.

16. The system of claim 15, wherein the second section has a first portion tapering towards the first section and a second portion tapering towards the third section.

17. The system of claim 1, wherein the band comprises a flat material that is coiled up, the first section of the flat material having the first cross-sectional area of the second section of the flat material having the second cross-sectional area.

18. The system of claim 1, wherein the second end is attached to the chassis inside of the chassis of the electronic display monitor.

19. The system of claim 1, wherein the first constant width and the second constant width are equal.

20. The system of claim 1, wherein the third section has a continuously varying cross-sectional area across an entirety of the third length.

21. A system to adjust a chassis of an electronic display monitor relative to a base comprising:
the base;
the chassis connected to the base by a variable mounting point; and
a negator spring with at least a first and a second cross sectional area to oppose a force as the chassis is moved along the variable mounting point, wherein the first cross sectional area is defined by a first portion and the second cross sectional area are different, wherein the variable mounting point is curved from the top of the chassis to the bottom of the chassis, wherein the negator spring includes a first end attached to the base and a second end attached inside of the chassis of the electronic display monitor.

22. The system of claim 21, wherein the negator spring comprises a band comprising a first section and a second section, wherein the band is partially wound into a coil, wherein the first section applies a first force opposing unwinding of the coil and wherein the second section applies a second force, different than the first force, opposing unwinding of the coil.

23. A system to adjust a chassis of an electronic display monitor relative to a base comprising:
the base;
the chassis connected to the base by a variable mounting point; and
a negator spring to oppose a force as the chassis is moved along the variable mounting point, wherein the variable mounting point is curved from the top of the chassis to the bottom of the chassis, the negator spring comprising a band having a length extending between a first end attached to the base and a second end attached to the chassis, the band having a first section along the length, which when uncoiled, has a first cross-sectional area and a second section along the length, which when uncoiled, has a second cross-sectional area different than the first cross-sectional area, wherein band has a free end and a coiled end, wherein the band has a width that narrows towards the coiled end.

* * * * *